US007478428B1

(12) United States Patent
Thomlinson

(10) Patent No.: US 7,478,428 B1
(45) Date of Patent: Jan. 13, 2009

(54) ADAPTING INPUT TO FIND INTEGER OVERFLOWS

(75) Inventor: Matthew W. Thomlinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 10/963,296

(22) Filed: Oct. 12, 2004

(51) Int. Cl.
    *H04L 29/00* (2006.01)
(52) U.S. Cl. .......................................... 726/22; 710/56
(58) Field of Classification Search ................ 708/498, 708/552
    See application file for complete search history.

(56) References Cited

U.S. PATENT DOCUMENTS

| 5,903,479 A | * | 5/1999 | Schwarz et al. | ............. 708/205 |
| 6,714,957 B1 | * | 3/2004 | Lohman | ..................... 708/498 |
| 7,284,274 B1 | * | 10/2007 | Walls et al. | ................... 726/25 |
| 2006/0080578 A1 | * | 4/2006 | Thiagarajan et al. | .......... 714/38 |
| 2007/0162890 A1 | * | 7/2007 | Meier et al. | ................ 717/100 |

* cited by examiner

*Primary Examiner*—Matthew B Smithers
(74) *Attorney, Agent, or Firm*—Lee & Hayes, PLLC

(57) ABSTRACT

Systems and methods are described for use in evaluating an application for security risks related to integer overflow conditions in conjunction with memory allocations. The evaluation includes finding a relationship between data input to the application and memory allocation requests made by the application. Having established the relationship, a memory allocation-requesting module within the application is tested, using input data selected using the relationship.

35 Claims, 5 Drawing Sheets

100

112 OPERATING SYSTEM OR TEST APPLICATION

110 TEST APPARATUS

- 114 DATA ANALYZER
- 116 DATA GENERATOR
- 118 ALLOCATION REQUEST EVALUATOR
- 120 INTERFACE TOOLS
- 122 FORMULA OR PROCEDURE

108 INPUT DATA

102 APPLICATION

104 MEMORY ALLOCATION REQUESTING MODULE

106 MEMORY ALLOCATION REQUEST

502
FIND A FIRST REFERENCE POINT BY: PROVIDING FIRST TEST INPUT DATA TO THE MEMORY ALLOCATION REQUESTING MODULE WITHIN THE APPLICATION; AND THEN, EXECUTING THE MEMORY ALLOCATION REQUESTING MODULE TO FIND A FIRST REFERENCE POINT

↓

504
FIND A SECOND REFERENCE POINT BY: PROVIDING SECOND TEST INPUT DATA TO THE MEMORY ALLOCATION REQUESTING MODULE WITHIN THE APPLICATION; AND THEN, EXECUTING THE MEMORY ALLOCATION REQUESTING MODULE TO FIND A SECOND REFERENCE POINT

↓

506
INFER THE RELATIONSHIP USING DATA FROM AT LEAST TWO EXECUTIONS OF THE MEMORY ALLOCATION-REQUESTING MODULE

508
DERIVE A FORMULA (E.G. AN EQUATION) DESCRIBING INPUT DATA AND MEMORY ALLOCATION REQUESTS

510
FIT A CURVE TO A GRAPH ACCORDING TO THE TEST INPUT DATA AND RESULTING MEMORY ALLOCATION REQUESTS

512
ASSUME THE RELATIONSHIP IS LINEAR AND INCLUDES THE TWO REFERENCE POINTS

*Fig. 5*

ADAPTING INPUT TO FIND INTEGER OVERFLOWS

TECHNICAL FIELD

The present disclosure generally relates to computer security, and more particularly to adapting input to find integer overflows.

BACKGROUND

A first step in a known method to breach security of a computer is to provide data to an application running on the computer, wherein the data provided results in the application making a request for a memory allocation. Frequently, such applications are forward-facing, e.g. the applications are configured for contacting other computers via the Internet, which provides opportunities for such data to be provided. In particular, the data provided to the application typically results in calculations by the application, which determine an appropriate size of the memory allocation request and subsequently copying of the provided data to that allocated area. A copy into a too-small area can breach the security of the machine. Accordingly, a goal of those trying to breach the security is to cause the calculation of the size of the memory allocation request to result in an integer overflow, thereby truncating the size of the memory request. Where this goal is accomplished, a memory allocation request may be made by the application to the operating system that is much smaller than appropriate. Accordingly, a buffer created using the memory allocation is actually much smaller than it is understood by the application to be, and buffer overrun of the small allocation may result. Such a buffer overrun potentially puts malicious executable code into an executable location.

As a result, attempts are made to rigorously test applications, so that buffer overruns are prevented. Testing applications may be integrated with the tested application, performing what may be called "fuzzing," i.e. a process by which different input data is sequentially fed to the application to see if the application handles the data without failure. In particular, testing procedures involve repeatedly providing test data to applications, thereby testing the calculations of memory size allocations under a variety of conditions. For example, where the application is an Internet browsing application, a variety of different web pages may be provided as a test of the application's ability to avoid buffer overrun conditions. However, potentially damaging data, in which input to the application results in a buffer overrun, is difficult to determine by what is essentially a trial-and-error method.

Fortunately, for reasons of computer security and operability generally, integer overflows occur only in rare circumstances. However, this infrequency means that testing for integer overflow conditions is very difficult; the input must create extremely unlikely circumstances. As a result, many security problems are revealed only after the application within which the problems arose has been used extensively by consumers. If the problem is known to hackers, then it may be used to introduce malicious executable code into the system.

Accordingly, a need exists for better ways to test and/or operate software, and in particular, to reduce and/or eliminate security breaches.

SUMMARY

Systems and methods are described for use in evaluating an application for security risks related to integer overflow conditions in conjunction with memory allocations. The evaluation includes finding a relationship between data input to the application and memory allocation requests made by the application. Having established the relationship, a memory allocation-requesting module within the application is tested, using input data selected using the relationship.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates, using a block diagram, an exemplary system for adapting input to find integer overflows.

FIG. 5 illustrating, using a flow chart, additional examples of how a relationship such as an equation, formula or procedure may be found relating data input to the application with memory allocation requests made by the application.

DETAILED DESCRIPTION

Figure 2:
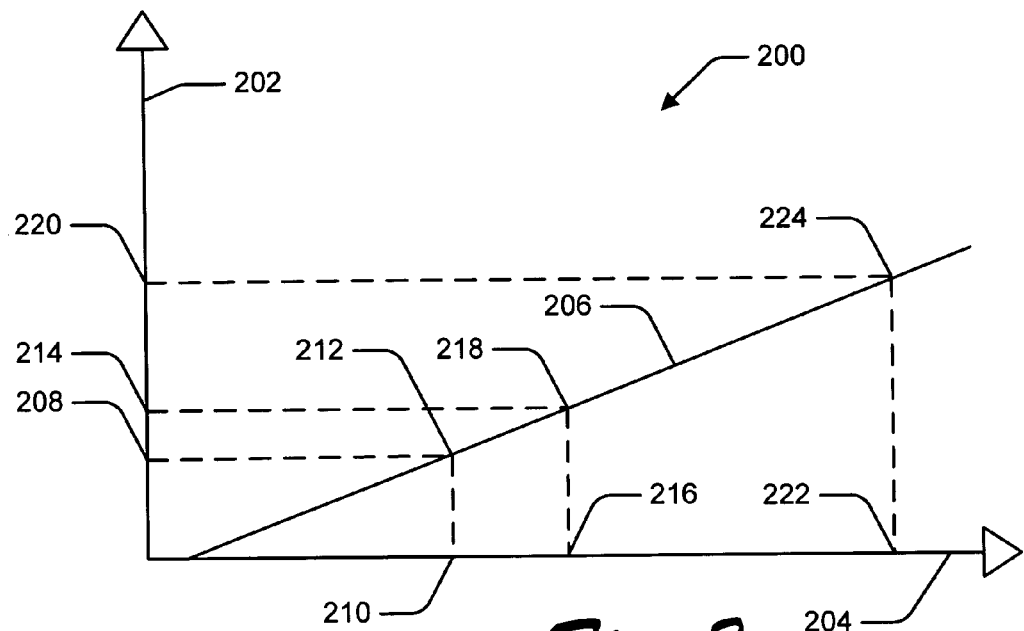
FIG. 2 illustrates, using a graph, an example of a relationship between input data and resulting memory allocation size wherein the application handles input desirably, avoiding unexpectedly small memory allocation requests.

Systems and methods are described for use in evaluating an application (i.e. an executable computer program) for security risks. Of particular concern are security risks associated with the malicious use of input, given to the application, which results in a request by the application for a memory allocation which is too small. Such memory allocation requests are made to the operating system for a memory allocation which—typically because of the allocation's small size—promotes buffer overrun and associated security breaches.

The evaluation of the application includes finding a relationship between data input to the application and memory allocation requests made by the application. Initially, it is noted whether the memory allocation request is fixed for all input values, or alternatively, whether the size of the allocation requests varies according to the input. Where the size of the memory allocation requests is found to vary as a function of the input data, the relationship between the two is ascertained. The relationship may be expressed as an equation, graph or formula. By using the relationship between the input data and memory allocation requests, an input value can be selected based on the likelihood that the selected input will result in a calculation involving integer overflow. The selected input is then passed to the application, thereby testing the application's handling of calculations potentially involving buffer overflow.

FIG. 1 illustrates an example of a system 100 configured for evaluation of the memory allocation requests made by an application 102 in response to input. In a typical configuration, the application 102 is forward-facing, i.e. it interfaces with, and receives data from, an untrusted party like the Internet. The application 102 includes a memory allocation requesting module 104 configured to generate memory allocation requests 106 in response to input 108 received by the application 102. For example, where the application 102 is an Internet browser program, configured to run on a personal computer (PC) or workstation, the input data 108 might include web pages or data generated, for purposes of testing the application 102, to resemble web pages. The memory allocation-requesting module 104 within the application 102 is typically configured as a software procedure or subroutine.

In the example of FIG. 1, the input 108 is provided to the application 102 by a test apparatus 110, which may be configured in software as an executable program or procedure defined on a computer-readable media device or apparatus, or in hardware using an application specific integrated circuit (ASIC) or other device. In the example of FIG. 1, the test apparatus 110 is operated within an environment 112 wherein the test apparatus may communicate with the application 102. Two examples of the environment 112 within which the test apparatus 110 may be configured are shown in FIG. 1. In one example, the test apparatus 110 may be included as a part of, or run by, the operating system, typically of the computer on which the application 102 is running. Accordingly, the test apparatus is run by action of the operating system, whether the test apparatus was part of, under the control of, the operating system. Such a configuration potentially allows memory allocation requests made by the application to be tested during operation of the application. In a second example, the test apparatus 110 may be configured as, or included as a part of, a test application, typically running on the computer on which the application 102 is running. In either case, the test apparatus 110 is able to communicate with the application 102 to be tested—and in particular to provide data 108 to the application 102, and to receive and/or monitor memory allocation requests 106 made by the application in response to the input data.

The test apparatus 110 is configured to include functionality as described herein, which may be organized in a variety of configurations to adapt to particular needs and/or circumstances. In the representative example of FIG. 1, the test apparatus is organized to include a variety of software structures, including a data analyzer 114, a data generator 116 and an allocation request evaluator 118 all of which are defined on a computer-readable media device or apparatus. An interface tool 120 is configured to provide a communications interface between the test apparatus 110 and the application 102. In particular, the interface tool is configured to provide input data 108 to the application 102 and to monitor the memory allocation requests 106 generated by the memory allocation-requesting module 104 within the application 102.

The data analyzer 114 is configured to find a relationship between input data 108 sent to the application 102, and memory allocation requests 106 which are made by the application 102. That is, the data analyzer 114 is configured to analyze the requests 106 generated by the memory allocation requesting module 104 of the application 102 in response to processing of the input data 108, and find a relationship between the requests 106 and data 108. In a conventional setting, such memory allocation requests would be sent to the operating system, and in response, the operating system would set aside memory for use by the application. However, the environment created by the test apparatus 110 allows the data analyzer 114 to monitor (typically via the interface tool 120) and analyze the memory allocation requests 106 made by the application 102. Analysis of pairs of input data 108 and associated memory allocation requests 106 enables derivation of a relationship between the two, wherein the relationship may be used to predict the memory allocation request for a given input value.

Where the application 102 is forward-facing—i.e. the application is in contact and interaction with the Internet—the application 102 may receive data in any of a variety of forms, such as web pages, emails, attachments and others. Where data is received, a memory allocation request may be made as a result of processing one or more portions of that data. In one implementation, the data analyzer 114 is configured to find a relationship between input data 108 and memory allocation requests 106 by executing the memory allocation-requesting module 104 two or more times, thereby finding two or more points of reference. An example of a relationship between the input data 108 and resulting memory allocation request 106 is shown for purposes of illustration in FIG. 2.

Referring to FIG. 2, a graph 200 shows an example of a possible relationship between different values of input data and memory allocation requests resulting from the input data. In particular, the magnitude of the input values 108 are seen along the vertical axis 202, and the size of the resulting memory allocation requests 106 are seen along the horizontal axis 204. The estimated relationship between any input value and an associated memory allocation request is expressed by the curve 206, which in this case is assumed to be a straight line passing through two initially plotted input data/memory allocation request points 212, 218.

Continuing to refer to FIG. 2, it can be seen that an input value having a magnitude shown by 208 along the vertical axis 202 results in a memory allocation having a magnitude shown by 210. Accordingly, an input data/memory allocation request point is graphed at 212. Similarly, where the input has magnitude 214, and the resulting memory allocation request has size 216, the resulting input data/memory allocation request point may be graphed at 218.

The data analyzer 114 is configured to analyze data, such as the two input data/memory allocation request points 212, 218, and to derive a graph, equation or similar expression of the relationship between input data magnitude and memory allocation request size. In the example of FIG. 2, the data analyzer 114 has fit a curve 206 to the data which is a simple line passing through both input data/memory allocation request points 212, 218. Note that curve-fitting technology is very well-developed; accordingly, a large number of alternative strategies could be employed to fit a curve 206 other than a straight line to two or more points representing input data/memory allocation request points on the graph 200. Thus, while the straight line 206 is very effective, it is also representative of other functions which may be used to explain the input data/memory allocation request relationship.

FIG. 2 shows an application 102 (see FIG. 1) which appears to correctly handle input data in a manner consistent with preventing unexpected data from resulting in unexpectedly small memory allocation requests. Note that an application can correctly handle memory allocation request in at least two ways: first, the application may allocate the proper amount of space; alternatively, the application may raise an error condition, which is recognized and properly handled. Accordingly, FIG. 2 represents an application which appears to prevent buffer overrun and security breaches by requesting memory allocations of adequate size. In particular, an unexpectedly high input value 220 results in a large memory allocation request 222 being made as a result of execution of the memory allocation requesting module 104 of the application 102. Where the data analyzer 114 correctly assumed that the relationship between input data and memory allocation requests was linear, the resulting input data/memory allocation request point 224 will be on the curve 206 representing expected memory allocation requests.

Note that while a straight line 206 was used in the example of FIG. 2, additional input data/memory allocation request points within the expected range for input data values may indicate that the curve should be more complex than the straight line. However, in many applications, the relationship between input data and a resulting memory allocation request is linear, and may be expressed by a simple equation 122 (FIG. 1) in the form of y=mx+b or similar. The relationship, linear or non-linear, may be expressed as an equation, formula or procedure by which input data is translated to expected memory allocation request. Such an equation or formula 122 may be used by the data generator 116, while testing the application 102, to produce input data calculated to test for potential math errors within the memory allocation software 104.

Returning to FIG. 1, the data generator 116 is configured to generate data for input to the application 102. Before the data analyzer 114 has derived a relationship 122 between the input data and the memory allocation requests, the data generator 116 is configured to select typical data values which are not intended to result in a malfunction of the memory allocation requesting module 104. For example, if the application 102 is an internet browser, then the data could be ordinary—i.e. non-malicious code containing—web pages. Two examples of such typical input data values are seen in the FIG. 2 at 208 and 214. In a typical application, the input data 208, 214 are separated by small variations (e.g. 1 byte) so that changes in the output are better controlled and more easily interpreted.

After the data analyzer 114 has derived a relationship 122 between the input data and the memory allocation requests, the data generator 116 is configured to use that relationship formula or equation to derive a further input value for transmission to the application. In particular, the data generator 116 generates input data which will result in integer overflow within the memory allocation requesting module 104 of the application 102 during the calculation of the memory allocation request if module 104 is poorly designed. That is, the data generator 116 attempts to test the memory allocation requesting module 104 in the location(s) wherein module 104 is most likely to fail.

In one example, the data generator 116 first identifies a value (e.g. 222 along the memory allocation request axis 204 of graph 200 in FIG. 2) wherein the size of the value indicates a high likelihood that integer overflow will result in calculations used to arrive at this value. For example, because most calculations involve 32-bit values, the memory allocation length $2^{32}+1$ may be selected for the value 222. Because the relationship 206 seen in FIG. 2 is linear, the value 222 is associated with an input data/memory allocation request point 224 and an input value 220. Accordingly, the data generator 116 may produce the value associated with location 220 as the input value 108 calculated to best test the memory allocation requesting module 104 of the application 102, so see if that module correctly prevents the integer overflow during the calculation of the memory allocation request 106.

An allocation request evaluator 118 is configured to determine if the memory allocation request 106 made by the memory allocation requesting module 104 is reasonable, in light of the input data 108. In general, a small memory allocation request may indicate that the memory allocation requesting module 104 has failed to calculate a reasonable memory allocation request, thereby raising the risk of a buffer overrun and the introduction of malicious code. A determination that the memory allocation is too small may be made by comparing the memory allocation to previous memory allocations. Thus, the memory allocations 210, 216 associated with inputs 208, 214, respectively, are used as a basis for comparison to the memory allocation 222, associated with input 220. Since the input data/memory allocation points 212, 218 and 224 are all co-linear, a reasonable assumption may be made that the memory allocation requesting module 104 handled the input value 220 correctly, and that the size 222 of the memory allocation request will not pose a security risk. Accordingly, the allocation request evaluator 118 is configured—when viewing the input data/memory allocation points 212, 218 and 224 of FIG. 2—to conclude that the application 102 has requested reasonable values for memory allocations, and that minimal security risks are present.

Figure 3:
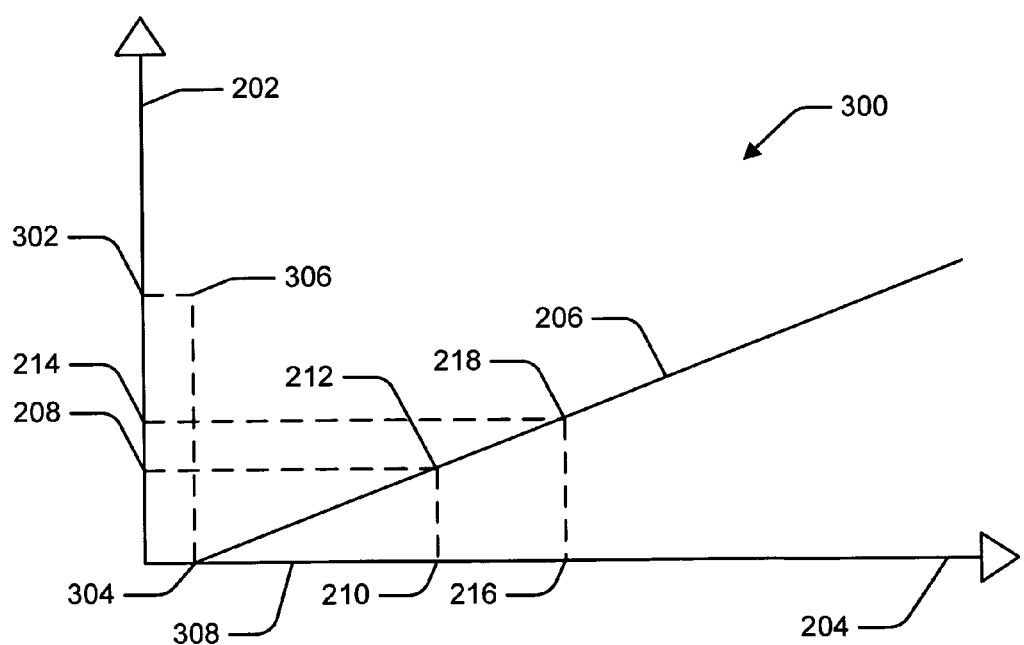
FIG. 3 illustrates, using a graph, a second example of a relationship between input data and resulting memory allocation size wherein the application includes a security risk, in that some input is associated with unexpectedly small memory allocation requests.

FIG. 3 shows a relationship between input data and memory allocation requests that is substantially similar to FIG. 2 for all typically used input values, e.g. input values 208 and 214. Accordingly, for most typical input data values, a memory allocation request which poses no security risk results. However, the graph 300 of FIG. 3 illustrates that an unexpectedly large input value 302 may result in an unexpectedly small memory allocation request 304. Accordingly, an attempt to insert malicious code may make use of such an unexpectedly large input value, thereby obtaining a small memory allocation. The resulting unexpectedly small memory allocation request provides the opportunity to overrun the buffer, and to insert malicious code.

The allocation request evaluator 118 is configured to distinguish between valid memory allocation requests, such as those seen in FIG. 2, and invalid memory allocation requests, such the request 304 seen in FIG. 3, resulting from the unusual input data 302. In one implementation, the allocation request evaluator 118 checks to see if all of the input data/memory allocation request points (e.g. 224, 304) are located on the curve which was fit to the data by the data analyzer 114. If all of the points are on the curve, then the memory allocation requests are presumed to be valid. For example, in FIG. 2, all of the points are on the (linear) curve. However, in FIG. 3, the point 306 is not on the curve 206. Accordingly, the allocation request evaluator 118 will indicate that the memory allocation request associated within input 302 is not valid, and that the memory allocation requesting module 104 of the application 102 has a flaw which may be exploited to result in security concerns.

Exemplary methods for adapting input to find integer overflows will now be described with primary reference to the flow diagrams of FIGS. 4 and 5. The methods apply generally to the operation of exemplary components discussed above with respect to FIGS. 1-3; however, the methods could also be utilized with different components, depending on the application. The elements of the described methods may be performed by any appropriate means including, for example, hardware logic blocks on an ASIC or by the execution of processor-readable instructions defined on a processor-readable medium.

A "processor-readable medium," as used herein, can be any means that can store instructions for use by or execution by a processor. A processor-readable medium can be, without limitation, an electronic, magnetic, optical, electromagnetic or semiconductor system, apparatus or device. More specific examples of a processor-readable medium include, among others, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

Figure 4:
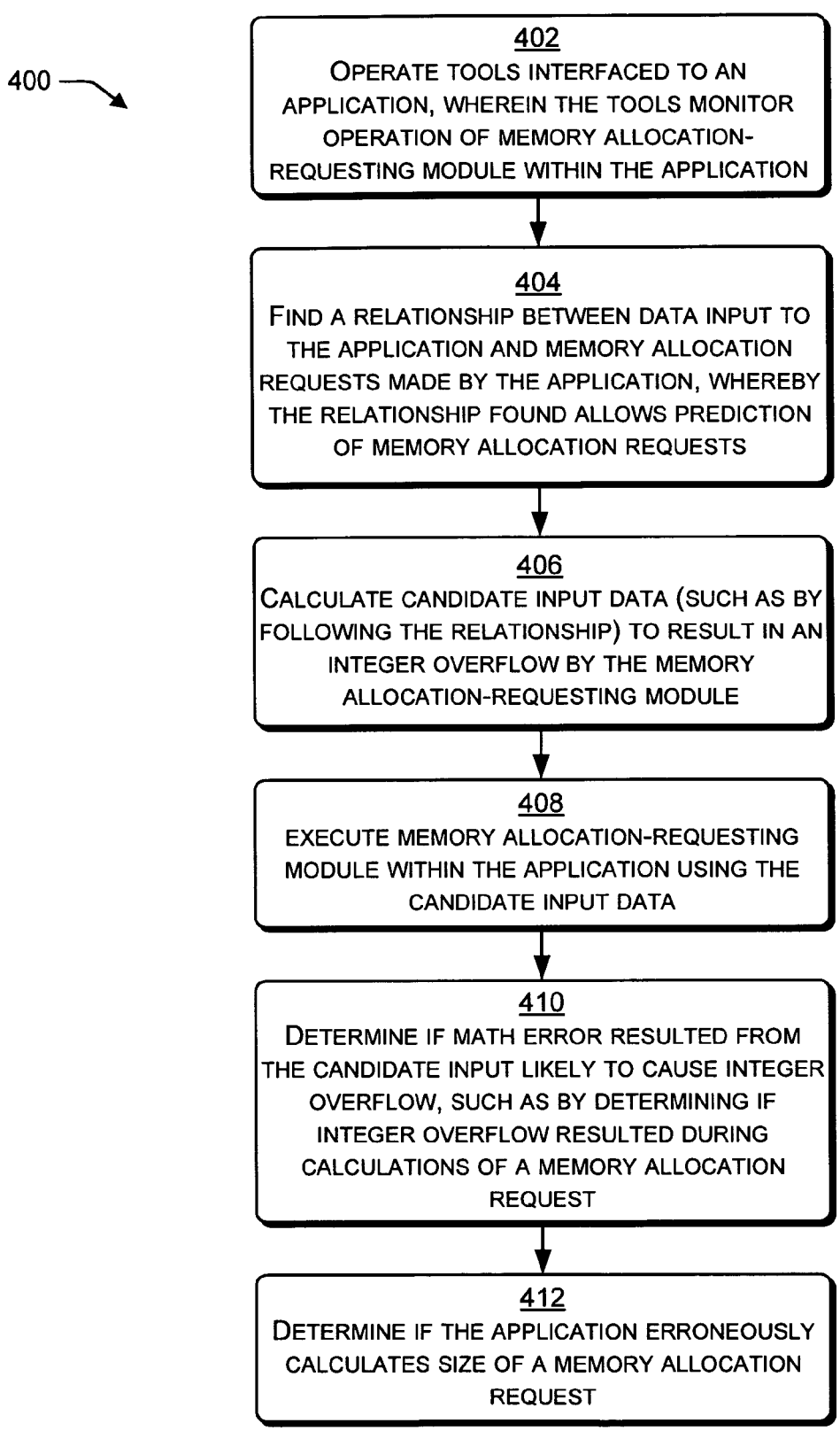
FIG. 4 illustrates, using a flow chart, one example of how input may be adapted to find integer overflows.

FIG. 4 is a flow chart 400 illustrating one example of how input may be adapted to find integer overflows. Accordingly, an application may be evaluated for security risks due to memory allocations by a test program and/or operating system, and test program and/or an operating system may manage memory allocations in a more secure manner. At block 402, tools interfaced to an application are operated in a manner wherein the tools monitor operation of a memory requesting module (e.g. group of executable commands) within the application. For example, FIG. 1 shows interface tools 120 that are configured generally to interface with application 102. More particularly, the interface tools 120 are configured to provide input data 108 to the application for processing by the memory allocation requesting module 104, and to receive memory allocation requests 106.

At block 404, a relationship between data input to the application and memory allocation requests by the application is found. Discovery and use of the relationship allows prediction of memory allocation requests for any given input. For example, FIG. 1 shows a data analyzer 114 configured to determine the relationship between data 108 input to the memory allocation requesting module 104 of the application 102. Initially, it is determined if the memory allocation is fixed, or if the size of the memory allocation request is a variable function, dependent on the input data. The relationship between the input data 108 and memory allocation request 106 can frequently be expressed as a formula or equation 122—such as a line in slope-intercept form—thereby facilitating prediction of memory allocation requests. FIG. 5 and associated discussion provides additional detail on how the relationship is found and described.

At block 406, a value is calculated for assignment as candidate input data to be transmitted to the application being tested. The calculation is made using the relationship found at block 404, and is intended to test the ability of the memory allocation requesting module 104 to deal with mathematical operations involving potential integer overflows. Accordingly, input data is selected using the relationship, and the memory allocation requesting procedure 104 is executed using the input data. In particular, the data generator 116 calculates input data 108 which tests the ability of the memory allocation requesting procedure 104 to avoid math errors, such as integer overflow, which may cause the memory allocation request 106 to be unexpectedly small. For example, the data generator 116 may select the input data 108 based on execution of a formula or equation 122 which appears to be likely to force the memory allocation requesting module 104 to perform calculations involving integer overflow.

At block 408, the memory allocation-requesting module 104 (FIG. 1) is executed, using the candidate input data calculated. In one example, the interface tools 120 (FIG. 1) which are interfaced to the application 102 trigger the execution.

At block 410, a determination is made if the application 102, or a memory allocation requesting procedure 104 within the application, made a math error while processing the input 108. Because the input 108 was selected at block 406 due to its likelihood to cause an integer overflow, the math error will probably include an integer overflow. Integer overflow is indicated by values that are smaller than expected, due to truncation in the overflow process. At block 412, a determination is made if the application 102 erroneously calculated the size of a memory allocation request 106—perhaps because of a math error. In general, memory allocation requests that are too small are the greatest threat to security. In the example of FIG. 1, the allocation request evaluator 118 is configured to evaluate if the memory allocation request was reasonable. Referring to FIGS. 2 and 3, a math error—and therefore an erroneous memory allocation request—is typically indicated by an input data/memory allocation request point which is not on the curve 206 derived by the data analyzer 114. Thus, an input data/memory allocation request point that is off the curve 206, such as point 306 in FIG. 3, indicates the probability of a math error in calculating the memory allocation request. Similarly, a math error can be assumed where the memory allocation value is too small, e.g. where the memory allocation value falls below a threshold value. For example, a threshold value 308 may be used as a "floor," indicating that any smaller memory allocation request is suspect.

FIG. 5 is a flow chart 500 illustrating one example of how a relationship such as an equation, formula or procedure may be found relating data input to the application with memory allocation requests made by the application. In part, FIG. 5 shows added detail explaining the operation of block 404 of FIG. 4.

At block 502, a first reference point is found, such as by the following two steps. First test input data is provided to the memory allocation requesting module 104 (FIG. 1) within the application 102. The memory allocation requesting module 104 is then executed using the provided data, thereby finding a first reference point.

At block 504, a second reference point is found in a manner similar to the first. In particular, a second test input data is provided to the memory allocation requesting module 104 (FIG. 1) within the application 102. The memory allocation requesting module 104 is then executed using the provided data, thereby finding a second reference point.

At block 506, the relationship between input data 108 and the memory allocation request 106 is inferred. For example, the data analyzer 114 of FIG. 1 is configured to provide to input values (e.g. 208 and 214 of FIG. 2) and obtain two memory allocation requests (e.g. 210 and 216 of FIG. 2) from the memory allocation requesting module 104 of the application 102. Blocks 508-512 show three representative examples of how the inference of block 506 may be performed.

At block 508, a formula or equation is derived from two or more applications of input data 108 to the memory allocation requesting module 104 and resulting memory allocation requests 106. The formula or equation 122 (FIG. 1) describes the relationship between the input data and memory allocation requests. At block 510, a curve is fit to a graph (or associated data) describing the input data 108 and associated memory allocation requests 106. The curve may be fit using any of the many well-known technologies which fit curves to data.

At block 512, the relationship between the input data 108 and the memory allocation requests 106 made by the memory allocation requesting module 104 is assumed to be linear. In many applications, this is a valid assumption. Even where the relationship is not actually linear, it is frequently the case that such an assumption will actually lead to a correct understanding of whether integer overflow resulted from any math calculations, and whether a resulting memory allocation request was appropriately sized with respect to the input data. The linear relationship is easily expressed as an equation (e.g. in $y=mx+b$ form) using the input data/memory allocation points 212, 218.

Accordingly, FIG. 5 illustrates several methods by which the relationship between input data 108 and memory allocation requests 106 can be determined. However, these methods are meant to be generally illustrative of methods generally by which such a relationship could be established.

Figure 6:
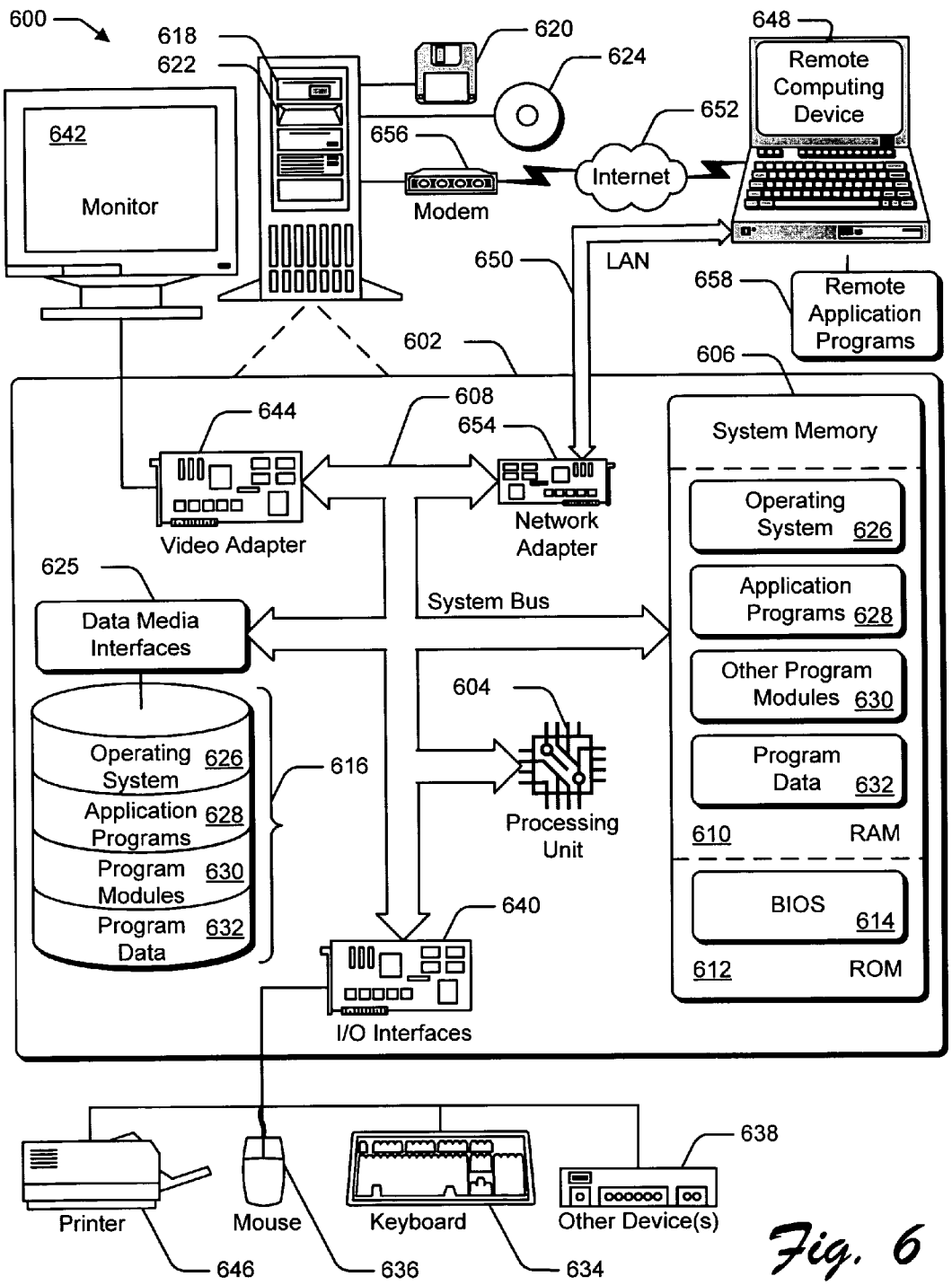
FIG. 6 illustrates an example of a computer system adapted for testing and/or operating an application wherein input is adapted to find integer overflows.

FIG. 6 illustrates an example of a computer system adapted for testing and/or operating an application wherein input is adapted to find integer overflows. The computing environment 600 includes a general-purpose computing system in the form of a computer 602. The components of computer 602 can include, but are not limited to, one or more processors or processing units 604, a system memory 606, and a system bus 608 that couples various system components including the processor 604 to the system memory 606. The system bus 608 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 602 typically includes a variety of computer readable media. Such media can be any available media that is accessible by computer 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 can also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by a SCSI interface (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a caching scheme for user network access information.

Computer 602 can include a variety of computer/processor readable media identified as communication media. Communication media typically embodies computer readable instructions, data structures, program modules, or other data defined on a computer-readable media device or apparatus.

A user can enter commands and information into computer system 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable storage media comprising processor-executable instructions for evaluating an application for security risks due to memory allocations, the processor-executable instructions comprising instructions for:
finding a relationship between data input to the application and memory allocation requests made by the application;
calculating input data, using the relationship, wherein the input data is calculated to test for a memory allocation request that results in a math error during operation of the application;
executing a memory allocation-requesting module within the application, using the calculated input data to calculate a memory allocation request; and
determining if the application erroneously calculated the memory allocation request by allowing overrun of a buffer defined in system memory of a computer system.

2. The one or more media as recited in claim 1, wherein finding the relationship between data input to the application and memory allocation requests made by the application comprises instructions for:
executing the memory allocation-requesting module twice to find two points of reference; and
assuming the relationship is linear and includes the two points of reference.

3. The one or more media as recited in claim 1, wherein finding the relationship between data input to the application and memory allocation requests made by the application comprises instructions for:
providing test input data to the memory allocation-requesting module; and
fitting a curve according to the test input data and resulting memory allocation requests.

4. The one or more media as recited in claim 1, wherein finding the relationship between data input to the application and memory allocation requests made by the application comprises instructions for:
inferring the relationship using data from at least two executions of the memory allocation-requesting module.

5. The one or more media as recited in claim 1, wherein finding the relationship between data input to the application and memory allocation requests made by the application comprises instructions for:
deriving a formula describing input data and memory allocation requests; and
solving the formula to obtain an input likely to cause integer overflow in the memory allocation-requesting module.

6. The one or more media as recited in claim 5, wherein the formula is based on a linear relationship between input data and memory allocation requests.

7. The one or more media as recited in claim 5, additionally comprising instructions for:
determining if the math error results from the input likely to cause integer overflow.

8. The one or more media as recited in claim 1, wherein using the relationship comprises additional instructions for:
calculating input data to test for an integer overflow by the memory allocation-requesting module of the application.

9. The one or more media as recited in claim 1, additionally comprising instructions for:
operating tools interfaced to the application, wherein the tools monitor operation of the memory allocation-requesting module.

10. The one or more media as recited in claim 1, additionally comprising instructions for:
determining if the application erroneously calculates size of a memory allocation.

11. The one or more media as recited in claim 1, additionally comprising instructions for:
determining if the math error resulted from an error in the calculation of a memory allocation request.

12. The one or more media as recited in claim 1, additionally comprising instructions for:
performing the evaluation of the application for security risks within a test environment configured to test applications.

13. The one or more media as recited in claim 1, additionally comprising instructions for:
performing the evaluation of the application for security risks by action of an operating system.

14. One or more computer-readable storage media comprising processor-executable instructions for managing memory allocations, the processor-executable instructions comprising instructions for:
establishing a procedure by which memory allocation requests may be predicted based on input to an application;
selecting input data using the procedure, wherein the input data is selected to test for an integer overflow during operation of the application; and
supplying the selected input data to the application;
executing a memory allocation request within the application based on the selected input data supplied to the application: and
determining if the application erroneously calculated the memory allocation request to allow overrun of a buffer defined in system memory of a computer system.

15. The one or more media as recited in claim 14, wherein establishing the procedure comprises instructions for:
providing test input data to the application; and
deriving an equation explaining the test input data and resulting memory allocation requests.

16. The one or more media as recited in claim 14, wherein establishing the procedure comprises instructions for:
deriving a formula describing input data and memory allocation requests; and
solving the formula to obtain an input likely to cause integer overflow within the application.

17. The one or more media as recited in claim 14, wherein establishing the procedure comprises instructions for:
obtaining at least two input data/memory allocation requests points; and
fitting a curve to the at least two input data/memory allocation requests points.

18. The one or more media as recited in claim 17, wherein the curve is a straight line.

19. The one or more media as recited in claim 14, wherein selecting input data using the procedure comprises additional instructions for:
following the procedure to discover input data which will result in a math error.

20. The one or more media as recited in claim 14, wherein selecting input data using the procedure comprises additional instructions for:
following the procedure to discover input data which will result in an integer overflow within the application during calculation of a memory allocation request.

21. The one or more media as recited in claim 14, wherein selecting input data using the procedure comprises additional instructions for:

following the procedure to discover input data which will result in an unexpected memory allocation request.

22. The one or more media as recited in claim 14, wherein supplying the selected input data to the application comprises additional instructions for:
performing an evaluation of the application within a test environment.

23. The one or more media as recited in claim 14, wherein supplying the selected input data to the application comprises additional instructions for:
performing an evaluation of the application by action of an operating system.

24. A test apparatus to test memory allocation requests made by an application, the test apparatus defined in one or more computer-readable storage media and comprising:
tools interfaced to the application to monitor memory allocation requests made by a memory allocation-requesting module within the application;
a data analyzer for finding a relationship between input data and a size of the memory allocation requests, wherein the relationship is configured to allow prediction of memory allocation requests for given input data, and the data analyzer is configured for:
executing the memory allocation-requesting module two or more times to find two or more points of reference wherein each point of reference is associated with a memory allocation request; and
fitting a curve to the two or more points of reference;
a data generator for generating data to be input to the application, wherein the data is generated according to the relationship and selected in a manner to test for an integer overflow during operation of the application, and wherein the data is input to the application for use by the memory allocation-requesting module within the application; and
an allocation request evaluator configured to determine if operation of the application using the memory allocation request would result in integer overflow and to determine if a size of the memory allocation request was erroneous.

25. The test apparatus as recited in claim 24:
wherein the allocation request evaluator determines if a math error resulted in the integer overflow.

26. The test apparatus as recited in claim 24, wherein the data analyzer is additionally configured for:
assuming the relationship is linear and includes two points of reference.

27. The test apparatus as recited in claim 24, wherein the data analyzer is additionally configured for:
deriving a formula describing input data and memory allocation requests; and
solving the formula to obtain an input likely to cause integer overflow in the memory allocation-requesting module.

28. The test apparatus as recited in claim 27, wherein the test apparatus is configured to operate within a test application or an operating system environment.

29. A test apparatus to test memory allocation requests made by an application, the test apparatus defined in one or more computer-readable storage media and comprising:
means for predicting a memory allocation request by examination of results of at least two inputs to an application resulting in memory allocation requests, wherein the means for predicting comprises:
means for deriving a formula relating input data and memory allocation requests; and
means for solving the formula to obtain an input likely to cause integer overflow within the application; and
means for selecting input data according to the means for predicting a memory allocation request, wherein the selected input data tests the application's ability to correctly process data intended to result in integer overflow.

30. The test apparatus of claim 29, wherein the means for predicting additionally comprises:
means for fitting a curve to the at least two inputs.

31. The test apparatus of claim 30, additionally comprising:
means for integrating the test apparatus into an operating system, to allow memory allocation requests made by the application to be tested during operation of the application.

32. A method for evaluating an application for security risks, the method comprising:
finding a relationship between input data and memory allocation requests;
executing a memory allocation-requesting module within the application to obtain a memory allocation request, wherein input data which was provided to the application was selected by using the relationship and was calculated to test for math errors within the application; and
evaluating the memory allocation request for evidence of math errors;
wherein the evaluation of the application for security risks is performed within an operating system environment.

33. The method of claim 32, wherein finding a relationship comprises:
executing the memory allocation-requesting module within the application at least twice; and
inferring the relationship using data from the at least two executions of the memory allocation-requesting module.

34. The method of claim 32, wherein finding a relationship comprises:
deriving a formula describing input data and memory allocation requests; and
solving the formula to obtain an input likely to cause integer overflow in the memory allocation-requesting module.

35. The method of claim 32, wherein the evaluation of the application for security risks is performed within a test application configured for testing the application.

* * * * *

UNITED STATES PATENT AND TRADEMARK OFFICE
CERTIFICATE OF CORRECTION

| | | |
|---|---|---|
| PATENT NO. | : 7,478,428 B1 | Page 1 of 1 |
| APPLICATION NO. | : 10/963296 | |
| DATED | : January 13, 2009 | |
| INVENTOR(S) | : Matthew W. Thomlinson | |

It is certified that error appears in the above-identified patent and that said Letters Patent is hereby corrected as shown below:

In column 6, line 65, after "),"  delete "an optical fiber,".

In column 12, line 31, in Claim 14, delete "application: and" and insert -- application; and --, therefor In column 13, line 26, In Claim 24, before "wherein" delete "reference" and insert -- reference, --, therefor.

Signed and Sealed this

Third Day of May, 2011

David J. Kappos
*Director of the United States Patent and Trademark Office*